United States Patent
Merz

(10) Patent No.: US 6,892,687 B2
(45) Date of Patent: May 17, 2005

(54) CAMSHAFT AND A METHOD AND A DEVICE FOR PRODUCING THE SAME

(76) Inventor: Karl Merz, Hohenweg 14, 5734, Reinach (CH)

( * ) Notice: Subject to any disclaimer, the term of this patent is extended or adjusted under 35 U.S.C. 154(b) by 0 days.

(21) Appl. No.: 10/257,459
(22) PCT Filed: Apr. 2, 2001
(86) PCT No.: PCT/CH01/00208
§ 371 (c)(1),
(2), (4) Date: Jan. 14, 2003
(87) PCT Pub. No.: WO01/79661
PCT Pub. Date: Oct. 25, 2001

(65) Prior Publication Data
US 2003/0150413 A1 Aug. 14, 2003

(30) Foreign Application Priority Data
Apr. 14, 2000 (CH) ............................................. 739/00

(51) Int. Cl.[7] ................................................. F01L 1/04
(52) U.S. Cl. ..................... 123/90.6; 29/888.1
(58) Field of Search .......................... 29/888.1; 123/90.6

(56) References Cited

U.S. PATENT DOCUMENTS

| | | | | |
|---|---|---|---|---|
| 4,858,295 A | * | 8/1989 | Hartnett et al. ............ | 29/888.1 |
| 5,101,554 A | * | 4/1992 | Breuer et al. .............. | 29/888.1 |
| 5,187,866 A | * | 2/1993 | Rhoades ..................... | 29/888.1 |
| 5,299,881 A | | 4/1994 | Mettler-Friedli | |
| 5,664,463 A | | 9/1997 | Amborn et al. | |
| 6,422,947 B1 | * | 7/2002 | Kelly et al. ................. | 464/182 |

FOREIGN PATENT DOCUMENTS

| | | |
|---|---|---|
| DE | 3433595 A1 | 3/1986 |
| DE | 3736422 A1 | 5/1989 |
| DE | 4306621 A1 | 9/1994 |
| JP | 03181652 | 8/1991 |
| JP | 03181654 | 8/1991 |
| JP | 03189308 | 8/1991 |
| JP | 03194105 | 8/1991 |
| JP | 04308305 | 10/1992 |
| WO | WO 0179661 A1 | 10/2001 |

* cited by examiner

*Primary Examiner*—Thomas Denion
*Assistant Examiner*—Zelalem Eshete
(74) *Attorney, Agent, or Firm*—Tarolli, Sundheim, Covell & Tummino L.L.P.

(57) ABSTRACT

A camshaft has a cylindrical shaft (1) and a hollow, cylindrical cam (2). The hollow, cylindrical cam (2) is pushed onto the cylindrical shaft (1) and securely fixed to the cylindrical shaft (1) in terms of rotation and displacement. The hollow, cylindrical cam (2) is provided with a foot strip (2.2, 2.3) that borders the cylindrical shaft (1) on one side and is welded to the cylindrical shaft (1) along, and through, the foot strip (2.2, 2.3).

43 Claims, 3 Drawing Sheets

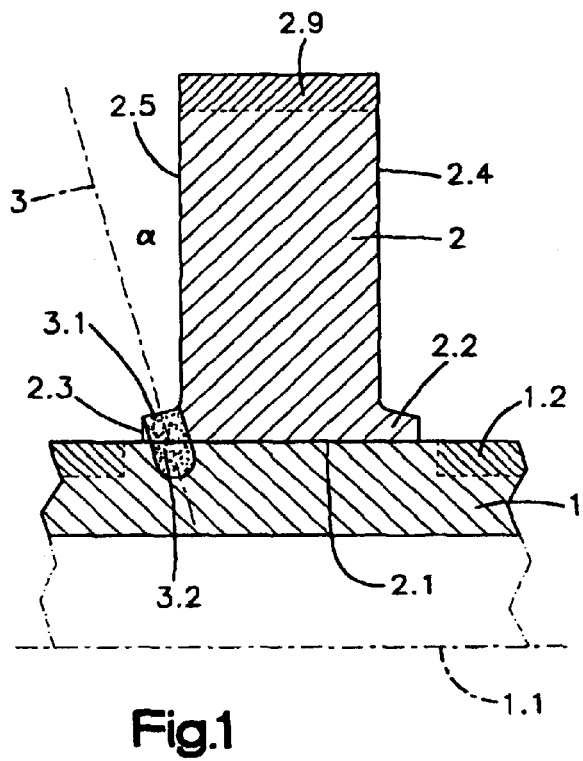
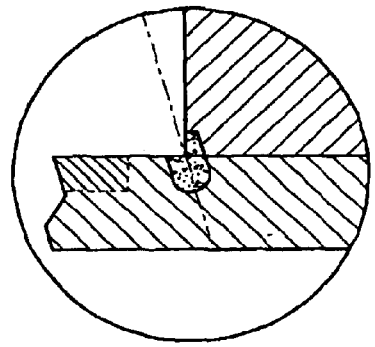
Fig.1
Fig.2
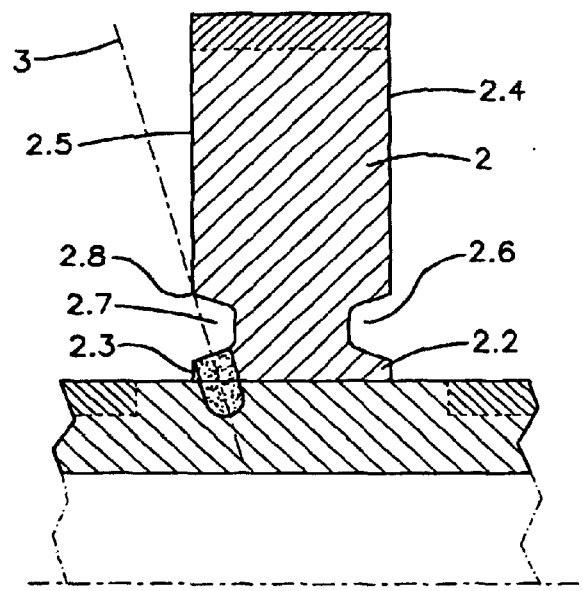
Fig.3

CAMSHAFT AND A METHOD AND A DEVICE FOR PRODUCING THE SAME

TECHNICAL FIELD

The present invention relates to a camshaft, as used for example in combustion engines for automobiles, with a cylindrical shaft and with at least one hollow-cylindrical cam pushed onto the latter and fixed on it securely in terms of rotation and displacement.

Camshafts of this type, assembled from a number of individual parts, are being used increasingly in place of camshafts produced by casting or forging techniques.

The invention also relates to a novel method for producing such camshafts and also to a device for carrying out the method.

PRIOR ART

For fixing the cams, of which there are usually a plurality, on the shaft, various methods are known in the prior art:

In the case of a first such method, the shafts are provided in the region of the cams with a rolled-on zero-pitch thread protruding beyond the diameter of the shaft and the opening or bore of the cams is provided with broached axial grooves. When the cams are pressed onto the shaft, a frictional positive engagement is produced between the two parts, by the two contours interlocking. However, the method has various disadvantages:

- During roller-burnishing, the shafts are elongated and bent quite considerably. Therefore, each shaft subsequently has to be shortened to its desired size and the bending corrected by straightening. The bearing points of the shafts can only be ground to the final dimensions after the cams have been pressed on. The tolerances occurring must be taken into account by an oversize of at least 0.5 mm.
- The cams are deformed while they are being pressed on, this so-called cam growth varying and not allowing itself to be monitored easily. This also requires each individual cam to be reworked by a grinding operation. Depending on the deformation of the cam, this results in uneven removal of material over its circumference. A surface hardness zone of uniform thickness previously produced by inductive means is made uneven in its thickness as a result. Since a minimum thickness is usually prescribed for this hardness zone, it must also be overdimensioned from the outset.
- When the cams are being pressed on, it may happen that they tilt slightly, because the systems of grooves mentioned do not make the cams sit straight on the shaft. The cams then move eccentrically to some extent. Added to this is the fact that the front edge of their opening in the direction in which they are pressed on is always provided with a phase, which slightly shortens the axial length of the cams, which is important for the alignment and seating of the cams. These tolerances also have to be taken into account by adequate oversize and subsequently removed again by grinding.
- When the cams are forcibly pressed on, there is the risk of cracks forming in the cams, which may be a reason for them to be rejected.
- The many necessary machining steps and considerable degree of reworking after the cams have been pressed on makes production quite time-intensive.

In the case of another method, a shrink fit is produced between the cams and the shaft. In this case, the opening of the cams is chosen to be somewhat smaller in diameter than the outside diameter of the shaft. The cams are then pushed onto the shaft in the heated state, with the shaft cooled to a low temperature. After equalizing the temperature of the parts, the desired shrink fit is obtained. However, this is usually not adequately secure to withstand the torques occurring on the cams, for example in a car engine. Therefore, a system of teeth, similar to in the case of the methods described above, is usually additionally required.

In the case of a further method, the shaft formed as a tube is subjected to a high internal pressure after the cams have been pushed on, causing the shaft to expand and, as a result, likewise producing a press fit of the cams on the shaft. Since the shaft expands even beyond the inside diameter of the cams in the region between the cams, here, too, the bearing points arranged in these zones must be reworked considerably by a grinding operation.

SUMMARY OF THE INVENTION

The present invention has the object of providing a camshaft of the type stated at the beginning which can be produced with adequate strength, in particular more quickly and at lower cost. This object is achieved according to the invention by a camshaft such as that defined in patent claim 1 and in which the at least one cam is provided with a foot strip that borders the tube at least on one side and is welded to the shaft along and through this at least one foot strip.

A corresponding method for producing such a camshaft is specified in patent claim 6.

Patent claim 18 also relates to a device for producing such a camshaft on the basis of the method of patent claim 6.

Advantageous and therefore preferred refinements and developments of the subjects of the invention are respectively specified in the dependent claims.

The advantages achieved by the invention can be seen in particular in the following points:

Since there is no longer any need for roller-burnishing of the shafts, no increase in length of the shafts occurs and also no bending caused as a result, and the cams do not experience any cam growth when they are fitted and welded onto the shafts, both the shafts and the cams can already be machined to their respective final dimensions before being assembled, or at least almost to their final dimensions, to within a few hundredths of a millimeter (near end shape). Laborious reworking by a grinding operation is no longer needed or is reduced to a minimum. As a result, the shafts and the cams do not have to be overdimensioned before being connected. By also avoiding uneven removal of surface hardness zones, these also do not have to be overdimensioned.

By allowing the cams to be provided with a smooth opening or bore and the diameter of the opening to be adapted very accurately to the outside diameter of the shafts, the cams need not be pressed onto the shafts with great force, thereby avoiding tilting of the cams and the formation of cracks in the cams.

Compared with the previously known camshafts, the camshafts according to the invention can be produced in a shorter time, extremely efficiently and at low cost, using fewer work operations, in particular with less reworking, with great accuracy and a low reject rate.

There is great freedom in the choice of materials for the shafts on the one hand and the cams on the other hand and also the greatest possible flexibility in the types of construction.

BRIEF EXPLANATION OF THE FIGURES

The invention is to be explained in more detail below on the basis of exemplary embodiments in conjunction with the drawing, in which the figures are respectively in section apart from FIG. 6 and in which:

FIG. 1 shows a short portion of a camshaft according to the invention with a cam welded onto the tubular shaft initially only on one side and provided with welding foot strips;

FIG. 2 shows in a detail the welded joint as it would be obtained without such welding foot strips;

FIG. 3 shows a formation as an alternative to FIG. 1, in which the welding foot strips on the cam represented do not protrude beyond the faces of the latter and are respectively formed by a groove;

WAYS OF IMPLEMENTING THE INVENTION

Figure 4:
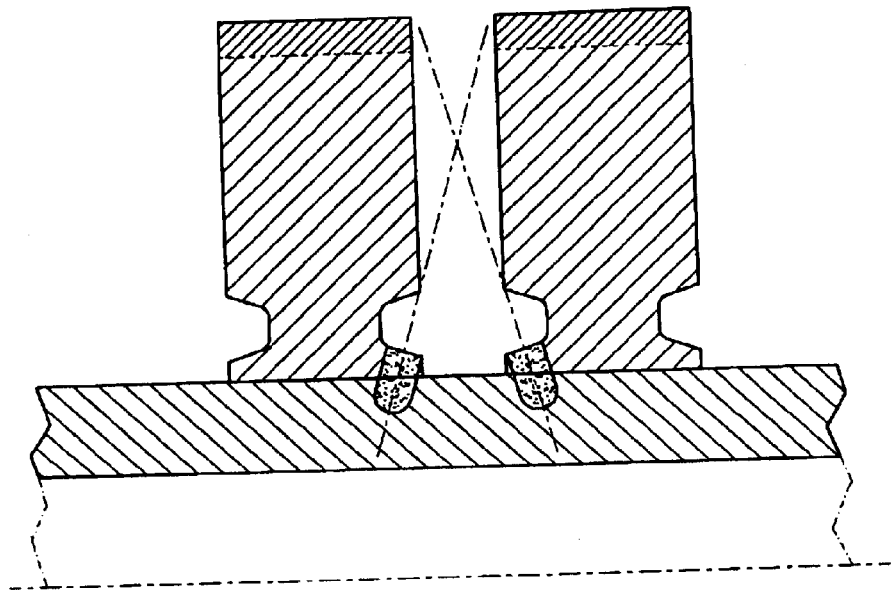
FIG. 4 shows a representation similar to FIG. 3, only with two cams close by each other.

In FIG. 1, a short portion of a (here) tubular, hollow-cylindrical shaft is denoted by 1, the axis of which is denoted by 1.1. Pushed with an exact fit onto the shaft 1 is a likewise hollow-cylindrical cam 2. Bordering its opening or bore 2.1, this cam 2 is provided with two peripheral foot strips 2.2 and 2.3, which protrude laterally beyond the two faces 2.4 and 2.5.

By means of a laser or electron beam, indicated by 3, the cam 2 is welded onto the shaft 1 or welded to the shaft 1, to be precise preferably running all the way around its circumference, along and through the foot strip 2.3 obliquely from above at an angle a with respect to the radial direction. An identical welding is also in fact provided and preferred on the other side of the cam 2 along the other, identical foot strip 2.2, although this is still omitted in the representation of FIG. 1 in order that the shape and formation of the foot strips 2.2 and 2.3 can be seen better. The same also applies to the subsequent FIGS. 2, 3 and 5, in which a welded joint is also in each case only represented on one side.

As can be clearly seen in FIG. 1, the presence of the foot strips 2.2, 2.3 produces a welded joint (welded cone) 3.1 with a virtually optimum weld cross section 3.2, the width of which corresponds approximately to the width of the foot strips and thus produces an extremely good connection between the cam 2 and the shaft 1 which is strong and permanent. FIG. 2 shows for comparison a welded joint between a shaft 1 and a cam 2 as would be obtained without a foot strip according to FIG. 1 on the cam, under otherwise the same conditions. Here, the width of the weld cross section would, however, be half that which is possible with the foot strip. Here it would also in fact be necessary to weld at a greater angle α.

FIG. 3 shows an embodiment which is modified in comparison with FIG. 1 and in which, with otherwise the same conditions, the two foot strips 2.2 and 2.3 on the cam 2 represented do not protrude beyond its faces 2.4 and 2.5, but through which in each case a groove 2.6 and 2.7 is respectively formed. The height of the foot strips 2.2 and 2.3 results here in particular from the radial distance of the grooves from the shaft 1 or from the opening 2.1 of the cams. The grooves allow the welding beam 3 to be directed at the same steep angle α as in FIG. 1 past the upper edge 2.8 of the groove onto the foot strips 2.2 and 2.3. By suitable forming of the grooves 2.6 or 2.7, an even steeper angle α than the angle of 20° chosen for the figures may be readily possible. A steep welding angle α may be required, for example, if two cams have to be arranged on the shaft 1 with only a small distance between them, as represented in FIG. 4. A welding angle in the range between 3° and 40° is preferred overall.

Figures 5A, 5B, 5C:
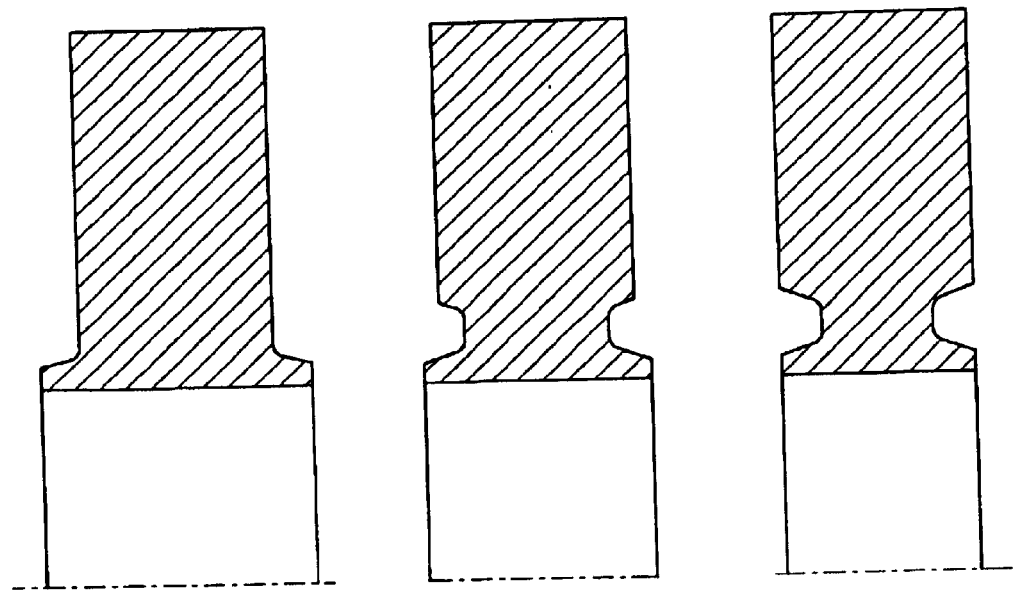
FIG. 5 shows three cams with differently formed foot strips next to one another in comparison.

FIG. 5 shows under a)–c) three cams according to the invention next to one another, the one represented under a) corresponding to the configuration of FIG. 1 with foot strips protruding laterally beyond the faces and the one represented under c) corresponding to the configuration of FIG. 3 with foot strips formed by grooves and not protruding laterally beyond the faces. The cam-represented in the middle under b) represents a transitional form between the two outer forms, in that in this case the foot strips laterally protrude only partially beyond the faces of the cam, but the grooves are also not formed as deeply. It is clear from FIG. 5 that any transitional form between the two variants represented on the outside can be used in principle, depending on the given requirements. As far as the shaping of the foot strips is concerned, it is preferred to form them with a slightly sloping upper side, in order that the welding beam impinges on them approximately perpendicularly. The height of the foot strips should lie approximately in the range of their between their width and half their width.

It can be seen from all the cams represented in FIG. 5 that the axial length of their opening or bore 2.1 is at least equal to, in the embodiment according to a) and b) even greater than, their axial length (distance between their faces) in total. This gives the cams an excellent seating on the shaft with exact alignment transversely in relation to the axial direction of the latter. This is all the more the case if the lateral surface of the shaft and the inner surfaces of the cams are smooth and worked to fit each other exactly, which is preferred.

Figure 6:
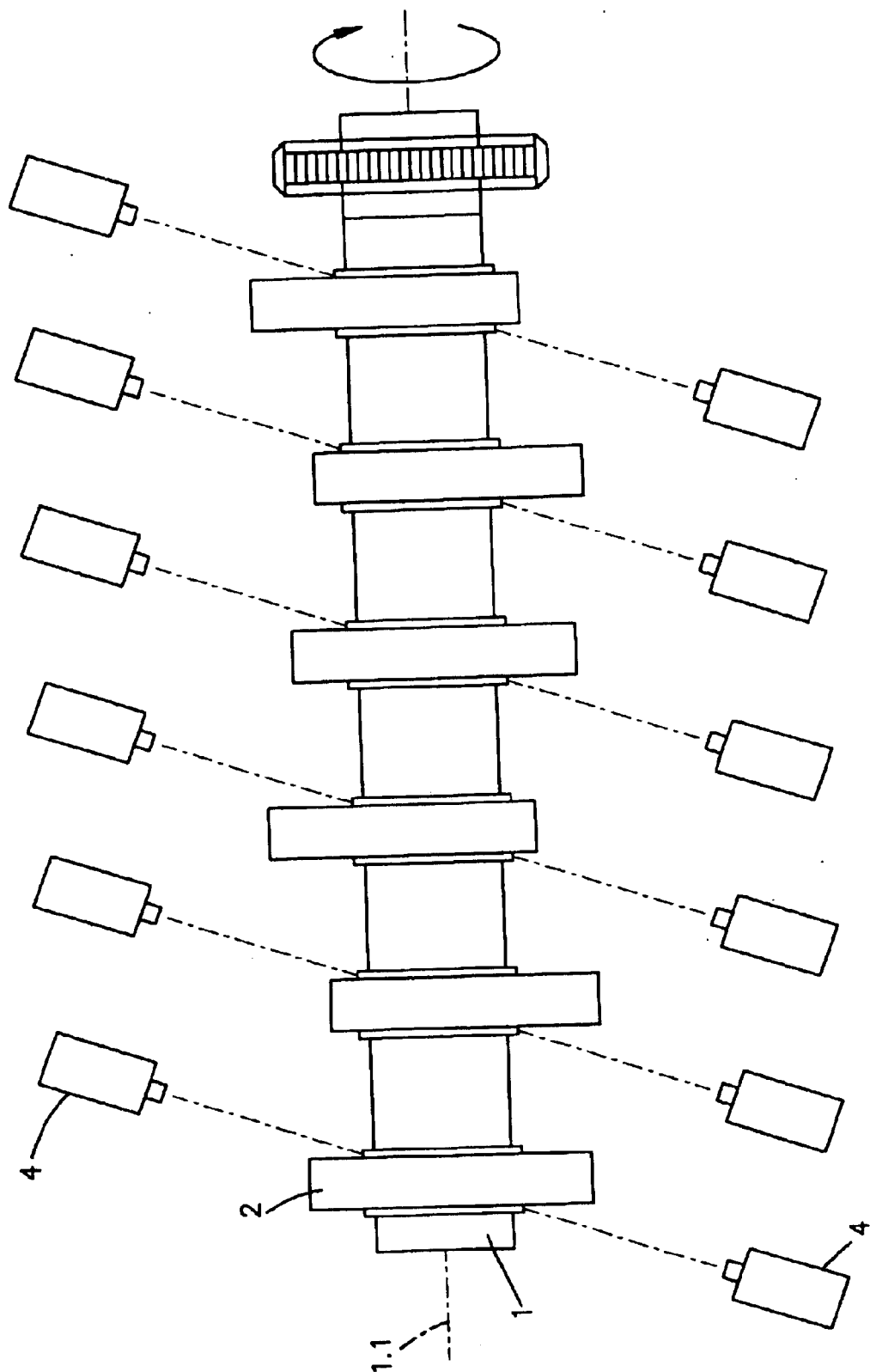
FIG. 6 schematically shows in elevation an arrangement for producing camshafts according to the invention with a multiplicity of laser or electron-beam welding heads.

FIG. 6, furthermore, shows an arrangement which can be used with advantage for the production of camshafts according to the invention. Represented in FIG. 6, although only schematically, is a shaft 1 with a plurality of pushed-on cams 2 and, for each cam 2, two welding heads 4, which may be laser or electron welding heads. The welding heads 4 are aligned in such a way that their welding beams 3 impinge on the foot strips 2.2 and 2.3 of the cams 2. FIG. 6 is to be understood as illustrating that the shaft 1 is axially clamped by means which are not represented and is rotated about its axis 1.1 while the welding heads 4 are at the same time put into operation. In this way, it is possible in an operation lasting only a few seconds to fasten all the cams 2 simultaneously on the shaft 1 by a welding technique.

The welding subjects the shaft 1 and the cams 2 to comparatively little strain and consequently they maintain their shape in an advantageous way. In the case of a tubular shaft, the heat introduced locally into the shaft 1 and the cams 2 by the welding can even be additionally carried away for example by passing a cooling medium through the shaft, which further reduces the possible adverse effects on the parts.

Before the preferably continuous welded joint is applied, it may be required for the cams 2 to be prefixed on the shaft in their desired position and rotational location. This may take place, for example, by tack welding, but also by one or more of the prior-art connecting methods explained at the beginning, such as a shrink fit, frictional positive engagement or high internal pressure. Since the preliminary connection does not have to be particularly secure and not at all permanent, the disadvantages of the known fastening methods described at the beginning can in this case be avoided.

As a result of the dimensional stability of the shafts and the cams obtained by the structural design and fastening technique according to the invention, they can, as already mentioned, be prefabricated already before being assembled to their desired final dimensions or at least almost to these final dimensions. Laborious re-grinding of the parts is no longer needed at all as a result, or can at least be performed in only a very short machining time. Surface hardness zones, such as the zones denoted in the figures by 2.9 on the lateral surface of the cams 2 or the later bearing points denoted by 1.2 on the shafts 1, can, as a result, likewise already be provided in advance, to be precise without having to be overdimensioned considerably in their thickness or depth, as the prior art requires. The hardness zones 2.9 or 1.2 can also be advantageously produced subsequently, i.e. after the welding-on of the cams, with the laser or electron-beam devices 4 used in any case. In the event that, contrary to expectations, certain instances of bending of the shaft nevertheless occur during the welding-on of the cams, they are in any case so slight that they can be straightened directly by local heating of the shaft, also again with one of the laser or electron-beam devices 4.

The cams 2 as such or the foot strips 2.2 and 2.3 on the cams can be advantageously produced by simple forming techniques.

LIST OF DESIGNATIONS 1 shaft
1.1 axis of the shaft
1.2 hardness zones on the shaft
2 cams
2.1 opening/bore of the cams
2.2 foot strip
2.3 foot strip
2.4 cam face
2.5 cam face
2.6 groove
2.7 groove
2.8 edge
2.9 hardness zones on the cams
3 laser or electrode welding beam
3.1 welded joint
3.2 weld cross section
4 laser or electron welding heads

What is claimed is:

1. A camshaft having a cylindrical shaft (1) and a hollow, cylindrical cam (2) pushed onto, and securely fixed to, the cylindrical shaft (1) in terms of rotation and displacement, the hollow, cylindrical cam (2) being provided with a foot strip (2.2, 2.3) that borders the cylindrical shaft (1) on one side of the hollow, cylindrical cam (2) and is welded to the cylindrical shaft (1) along, and through, the foot strip (2.2, 2.3), the foot strip (2.2, 2.3) being formed laterally extending from a face (2.4, 2.5) of the hollow, cylindrical cam (2) and being formed by a groove-shaped notching (2.6, 2.7) present in the face (2.4, 2.5) at a radial distance from the cylindrical shaft (1).

2. The camshaft as claimed in claim 1, characterized in that welding is performed without application of additional material.

3. The camshaft as claimed in claim 1, characterized in that welding is performed such that the width of a weld cross section (3.2) between the hollow, cylindrical cam (2) and the cylindrical shaft (1) corresponds approximately to a width of the foot strip (2.2, 2.3) on the cylindrical shaft (1).

4. The camshaft as claimed in claim 1, characterized in that the cylindrical shaft (1) is provided with two neighboring cams (2), a foot strip being formed on at least one of the neighboring cams (2), the foot strip (2.2, 2.3) being located between the two neighboring cams (2) such that the foot strip (2.2, 2.3) can be reached over an entire circumference of the hollow, cylindrical cam (2) by a welding beam projecting past the one neighboring cam (2) at an angle ($\alpha$) of at most 40° with respect to a radial direction of the cylindrical shaft (1).

5. The camshaft as claimed in claim 1, characterized in that the cylindrical shaft (1) is a tube of annular cross section.

6. The camshaft as claimed in claim 1, characterized in that the foot strip (2.2, 2.3) produces a weld joint (3.1) having a weld cross section (3.2), the foot strip (2.2, 2.3) extending axially beyond the weld cross section (3.2).

7. The camshaft as claimed in claim 1, characterized in that the hollow, cylindrical cam (2) and the foot strip (2.2, 2.3) define an opening (2.1) with an internal cylindrical surface, the cylindrical shaft (1) extending though the opening (2.1) of the hollow, cylindrical cam (2), the internal cylindrical surface of the hollow, cylindrical cam (2) being connected by a weld (3.1) to an external cylindrical surface of the cylindrical shaft (1), the weld (3.1) extending through the foot strip (2.2, 2.3) and penetrating the external cylindrical surface of the cylindrical shaft (1), the weld (3.1) having, in an axial cross-section, a longitudinal axis (3) extending at an acute angle to a longitudinal axis (1.1) of the cylindrical shaft (1) and toward the hollow, cylindrical cam (2).

8. A camshaft having a cylindrical shaft (1) and a hollow, cylindrical cam (2) pushed onto, and securely fixed to, the cylindrical shaft (1) in terms of rotation and displacement, the hollow, cylindrical cam (2) being provided with a foot strip (2.2, 2.3) that borders the cylindrical shaft (1) on one side of the hollow, cylindrical cam (2) and is welded to the cylindrical shaft (1) along, and through, the foot strip (2.2, 2.3), the foot strip (2.2, 2.3) being formed by a groove-shaped notching (2.6, 2.7) present in a face (2.4, 2.5) of the hollow, cylindrical cam (2) at a radial distance from the cylindrical shaft (1).

9. The camshaft as claimed in claim 8, characterized in that welding is performed without application of additional material.

10. The camshaft as claimed in claim 8, characterized in that welding is performed such that the width of a weld cross section (3.2) between the hollow, cylindrical cam (2) and the cylindrical shaft (1) corresponds approximately to a width of the foot strip (2.2, 2.3) on the cylindrical shaft (1).

11. The camshaft as claimed in claim 8, characterized in that the cylindrical shaft (1) is provided with two neighboring cams (2), a foot strip being formed on at least one of the neighboring cams (2), the foot strip (2.2, 2.3) being located between the two neighboring cams (2) such that the foot strip (2.2, 2.3) can be reached over an entire circumference of the hollow, cylindrical cam (2) by a welding beam projecting past the one neighboring cam (2) at an angle ($\alpha$) of at most 40° with respect to a radial direction of the cylindrical shaft (1).

12. The camshaft as claimed in claim 8, characterized in that the cylindrical shaft (1) is a tube of annular cross section.

13. The camshaft as claimed in claim 8, characterized in that the foot strip (2.2, 2.3) produces a weld joint (3.1) having a weld cross section (3.2), the foot strip (2.2, 2.3) extending axially beyond the weld cross section (3.2).

14. The camshaft as claimed in claim 8, characterized in that the hollow, cylindrical cam (2) and the foot strip (2.2, 2.3) define an opening (2.1) with an internal cylindrical surface, the cylindrical shaft (1) extending though the opening (2.1) of the hollow, cylindrical cam (2), the internal cylindrical surface of the hollow, cylindrical cam (2) being connected by a weld (3.1) to an external cylindrical surface of the cylindrical shaft (1), the weld (3.1) extending through the foot strip (2.2, 2.3) and penetrating the external cylindrical surface of the cylindrical shaft (1), the weld (3.1) having, in an axial cross-section, a longitudinal axis (3) extending at an acute angle to a longitudinal axis (1.1) of the cylindrical shaft (1) and toward the hollow, cylindrical cam (2).

15. A method for producing a camshaft, said method comprising the steps of:
providing a hollow, cylindrical shaft (1) and a cylindrical cam (2), the cylindrical cam (2) having a foot strip (2.2, 2.3) that borders an opening (2.1) on one side of the cylindrical cam (2);
pushing the cylindrical cam (2) onto the hollow, cylindrical shaft (1);
welding, subsequent to said pushing step, the cylindrical cam (2) to the hollow, cylindrical shaft (1) along, and through, the foot strip (2.2, 2.3), the cylindrical cam (2) being securely fixed to the hollow, cylindrical shaft (1) in terms of rotation and displacement; and
cooling the hollow, cylindrical shaft (1), during said welding step, by passing a cooling medium through the hollow, cylindrical shaft (1).

16. The method as claimed in claim 15, characterized in that welding is performed without application of additional material with a welding device (4), a welding beam being directed onto the foot strip (2.2, 2.3) at an angle ($\alpha$) relative to a radial direction of the cylindrical shaft (1), the cylindrical shaft (1) and the hollow, cylindrical cam (2) being rotated at the same time about a longitudinal axis (1.1) of the cylindrical shaft (1).

17. The method as claimed in claim 15, characterized in that the cylindrical shaft (1) and the hollow, cylindrical cam (2) are machined to final dimensions before being assembled.

18. The method as claimed in claim 15, characterized in that the cylindrical shaft (1), in a bearing section (1.2), is hardened before being assembled.

19. The method as claimed in claim 15, characterized in that the hollow, cylindrical cam (2) is pre-fixed in a desired position on the cylindrical shaft (1) before welding.

20. The method as claimed in claim 19, characterized that the hollow, cylindrical cam (2) is prefixed by means of a thermal shrink fit.

21. The method as claimed in claim 15, characterized in that the hollow, cylindrical cam (2) is provided with a foot strip (2.2, 2.3) on both sides of the hollow, cylindrical cam (2) and is welded to the cylindrical shaft (1) simultaneously along, and through, both foot strips (2.2, 2.3).

22. The method as claimed in claim 15, characterized in that a plurality of cams (2) are pushed onto the cylindrical shaft (1) sequentially and are welded to the cylindrical shaft (1) simultaneously.

23. The method as claimed in claim 15, characterized in that and an outer surface of the cylindrical shaft (1) and an inner surface of the hollow, cylindrical cam (2) are smoothed before the hollow, cylindrical cam (2) is pushed onto the cylindrical shaft (1).

24. A device for producing a camshaft as claimed in claim 1 by performing the method as claimed in claim 15, characterized by a rotational securing means for the cylindrical shaft (1) and by a welding head (4), a welding beam (3) from the welding head (4) being directed onto the hollow, cylindrical cam (2), the hollow, cylindrical cam (2) being arranged on the cylindrical shaft (1) at an angle ($\alpha$) relative to a radial direction of the cylindrical shaft (1).

25. The device as claimed in claim 24, characterized in that a plurality of welding heads (4) are provided in a staggered manner and offset at an angle with respect to one another in an axial direction (1.1) of the rotational securing means.

26. A method for producing a camshaft, said method comprising the steps of:
providing a cylindrical shaft (1) and a cylindrical cam (2), the cylindrical cam (2) having a foot strip (2.2,2.3) that borders an opening (2.1) on one side of the cylindrical cam (2);
pushing the cylindrical cam (2) onto the cylindrical shaft (1)
welding, subsequent to said pushing step, the cylindrical cam (2) to the cylindrical shaft (1) along, and through, the foot strip (2.2, 2.3), the cylindrical cam (2) being securely fixed to the cylindrical shaft (1) in terms of rotation and displacement; and
straightening the cylindrical shaft (1) by local heating.

27. The method as claimed in claim 26, characterized in that welding is performed without application of additional material with a welding device (4), a welding beam being directed onto the foot strip (2.2, 2.3) at an angle ($\alpha$) relative to a radial direction of the cylindrical shaft (1), the cylindrical shaft (1) and the hollow, cylindrical cam (2) being rotated at the same time about a longitudinal axis (1.1) of the cylindrical shaft (1).

28. The method as claimed in claim 26, characterized in that the cylindrical shaft (1) and the hollow, cylindrical cam (2) are machined to final dimensions before being assembled.

29. The method as claimed in claim 26, characterized in that the cylindrical shaft (1), in a bearing section (1.2), is hardened before being assembled.

30. The method as claimed in claim 26, characterized in that the hollow, cylindrical cam (2) is pre-fixed in a desired position on the cylindrical shaft (1) before welding.

31. The method as claimed in claim 30, characterized that the hollow, cylindrical cam (2) is prefixed by means of a thermal shrink fit.

32. The method as claimed in claim 26, characterized in that the hollow, cylindrical cam (2) is provided with a foot strip (2.2, 2.3) on both sides of the hollow, cylindrical cam (2) and is welded to the cylindrical shaft (1) simultaneously along, and through, both foot strips (2.2, 2.3).

33. The method as claimed in claim 26, characterized in that a plurality of cams (2) are pushed onto the cylindrical shaft (1) sequentially and are welded to the cylindrical shaft (1) simultaneously.

34. The method as claimed in claim 26, characterized in that and an outer surface of the cylindrical shaft (1) and an inner surface of the hollow, cylindrical cam (2) are smoothed before the hollow, cylindrical cam (2) is pushed onto the cylindrical shaft (1).

35. A method for producing a camshaft, said method comprising the steps of:
providing a cylindrical shaft (1) and a cylindrical cam (2), the cylindrical cam (2) having a foot strip (2.2, 2.3) that borders an opening (2.1) on one side of the cylindrical cam (2);

pushing the cylindrical cam (2) onto the cylindrical shaft (1);

welding, subsequent to said pushing step, the cylindrical cam (2) to the cylindrical shaft (1) along, and through, the foot strip (2.2, 2.3), the cylindrical cam (2) being securely fixed to the cylindrical shaft (1) in terms of rotation and displacement; and producing the foot strip (2.2, 2.3) by a forming technique.

36. The method as claimed in claim 35, characterized in that welding is performed without application of additional material with a welding device (4), a welding beam being directed onto the foot strip (2.2, 2.3) at an angle ($\alpha$) relative to a radial direction of the cylindrical shaft (1), the cylindrical shaft (1) and the hollow, cylindrical cam (2) being rotated at the same time about a longitudinal axis (1.1) of the cylindrical shaft (1).

37. The method as claimed in claim 35, characterized in that the cylindrical shaft (1) and the hollow, cylindrical cam (2) are machined to final dimensions before being assembled.

38. The method as claimed in claim 35, characterized in that the cylindrical shaft (1), in a bearing section (1.2), is hardened before being assembled.

39. The method as claimed in claim 35, characterized in that the hollow, cylindrical cam (2) is pre-fixed in a desired position on the cylindrical shaft (1) before welding.

40. The method as claimed in claim 39, characterized that the hollow, cylindrical cam (2) is prefixed by means of a thermal shrink fit.

41. The method as claimed in claim 35, characterized in that the hollow, cylindrical cam (2) is provided with a foot strip (2.2, 2.3) on both sides of the hollow, cylindrical cam (2) and is welded to the cylindrical shaft (1) simultaneously along, and through, both foot strips (2.2, 2.3).

42. The method as claimed in claim 35, characterized in that a plurality of cams (2) are pushed onto the cylindrical shaft (1) sequentially and are welded to the cylindrical shaft (1) simultaneously.

43. The method as claimed in claim 35, characterized in that and an outer surface of the cylindrical shaft (1) and an inner surface of the hollow, cylindrical cam (2) are smoothed before the hollow, cylindrical cam (2) is pushed onto the cylindrical shaft (1).

* * * * *